(12) United States Patent
Ono et al.

(10) Patent No.: US 9,960,612 B2
(45) Date of Patent: May 1, 2018

(54) CHARGING AND DISCHARGING SYSTEM FOR A VEHICLE INCLUDING A FIRST FUSE IN THE VEHICLE AND A SECOND FUSE IN A CABLE CONNECTED TO THE VEHICLE

(71) Applicant: TOYOTA JIDOSHA KABUSHIKI KAISHA, Toyota-shi, Aichi-ken (JP)

(72) Inventors: Tomoya Ono, Toyota (JP); Osamu Yumita, Seto (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 221 days.

(21) Appl. No.: 15/033,276

(22) PCT Filed: Nov. 7, 2014

(86) PCT No.: PCT/IB2014/002363
§ 371 (c)(1),
(2) Date: Apr. 29, 2016

(87) PCT Pub. No.: WO2015/071721
PCT Pub. Date: May 21, 2015

(65) Prior Publication Data
US 2016/0268820 A1    Sep. 15, 2016

(30) Foreign Application Priority Data

Nov. 14, 2013    (JP) ................................. 2013-236058

(51) Int. Cl.
*H02J 7/00* (2006.01)
*H01H 85/02* (2006.01)
(Continued)

(52) U.S. Cl.
CPC .............. *H02J 7/0031* (2013.01); *B60L 3/04* (2013.01); *B60L 11/1812* (2013.01);
(Continued)

(58) Field of Classification Search
CPC ....... H02J 7/0031; B60L 3/04; B60L 11/1812; B60L 11/1818; B60L 11/1816;
(Continued)

(56) References Cited

U.S. PATENT DOCUMENTS 6,544,073 B2 *   4/2003   Kieninger ............ H01R 11/287
                                                      439/620.28
7,633,400 B2 *  12/2009   Coffey .................. H02H 3/046
                                                             326/39
(Continued)

FOREIGN PATENT DOCUMENTS

| JP | 2012-070577 A | 4/2012 |
| WO | 01/45226 A1 | 6/2001 |
| WO | 2013/065380 A2 | 5/2013 |

*Primary Examiner* — Edward Tso
*Assistant Examiner* — Manuel Hernandez
(74) *Attorney, Agent, or Firm* — Oliff PLC

(57) ABSTRACT

A charging and discharging system includes a vehicle, a cable, and a charging and discharging device. The vehicle includes an electric storage device, a first fuse, and an inlet. The cable includes a connector, a second fuse, and a power line. The charging and discharging device is configured to convert AC power supplied from a commercial AC power source into DC power and to supply the DC power to the electric storage device via the cable in a charging mode. The charging and discharging device is configured to convert DC power supplied from the electric storage device via the cable into AC power and to supply the AC power to a load in a discharging mode. The first fuse is configured to be melted and cut earlier than the second fuse when the power line causes a short circuit in the discharging mode.

5 Claims, 7 Drawing Sheets

(51) Int. Cl.

| | | |
|---|---|---|
| *H01R 13/68* | (2011.01) | |
| *B60L 3/04* | (2006.01) | |
| *B60L 11/18* | (2006.01) | |
| *H01H 9/10* | (2006.01) | |
| *H01H 85/20* | (2006.01) | |
| *H01R 13/696* | (2011.01) | |

(52) U.S. Cl.
CPC ....... *B60L 11/1816* (2013.01); *B60L 11/1818* (2013.01); *B60L 11/1842* (2013.01); *H01H 85/0241* (2013.01); *H01R 13/68* (2013.01); *B60L 2230/10* (2013.01); *B60L 2230/12* (2013.01); *H01H 9/10* (2013.01); *H01H 2085/208* (2013.01); *H01R 13/696* (2013.01); *H01R 2201/26* (2013.01); *Y02E 60/721* (2013.01); *Y02T 10/7005* (2013.01); *Y02T 10/7088* (2013.01); *Y02T 90/121* (2013.01); *Y02T 90/127* (2013.01); *Y02T 90/128* (2013.01); *Y02T 90/14* (2013.01); *Y02T 90/163* (2013.01); *Y04S 10/126* (2013.01)

(58) Field of Classification Search
CPC .............. B60L 11/1842; B60L 2230/12; B60L 2230/10; Y02T 90/14; Y02T 90/128; Y02T 90/121; Y02T 90/127; Y02T 90/163; Y02T 10/7005; Y02T 10/7088; Y04S 10/126; Y02E 60/721; H01H 9/10; H01H 2085/208; H01H 85/0241; H01R 13/68; H01R 13/696; H01R 2201/26
USPC .................................................. 361/626, 642
See application file for complete search history.

(56) References Cited

U.S. PATENT DOCUMENTS

| | | | |
|---|---|---|---|
| 2008/0014800 A1* | 1/2008 | Homyk | ................... H01R 31/06 439/638 |
| 2012/0108106 A1 | 5/2012 | de Chazal | |
| 2013/0082663 A1 | 4/2013 | Mori et al. | |
| 2015/0042288 A1* | 2/2015 | Ishii | ..................... B60L 11/123 320/135 |

* cited by examiner

CHARGING

BREAKDOWN WITH SHORT CIRCUIT

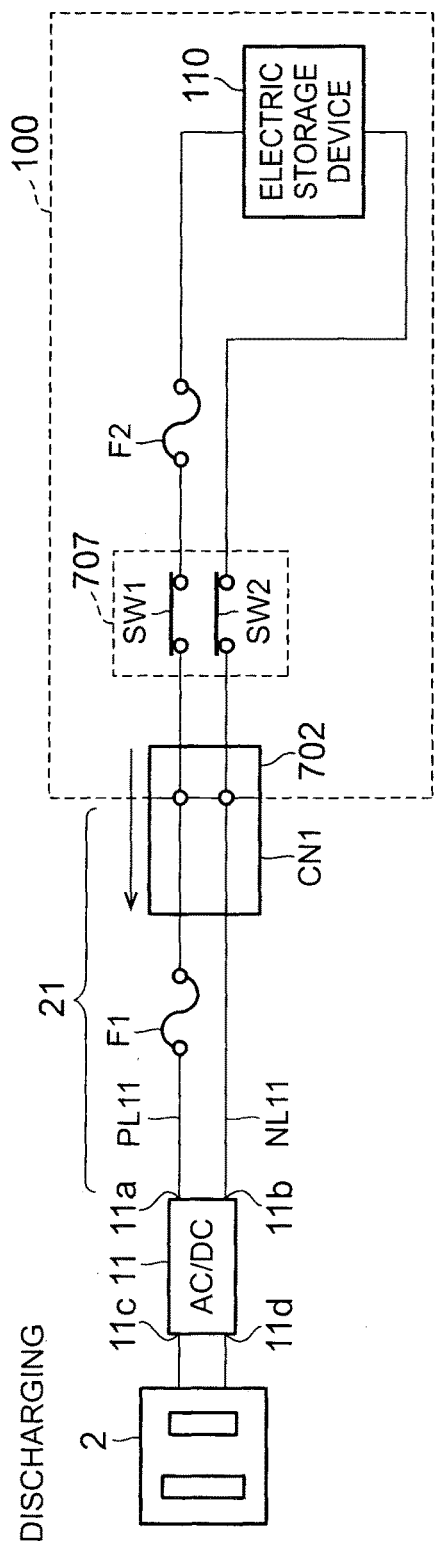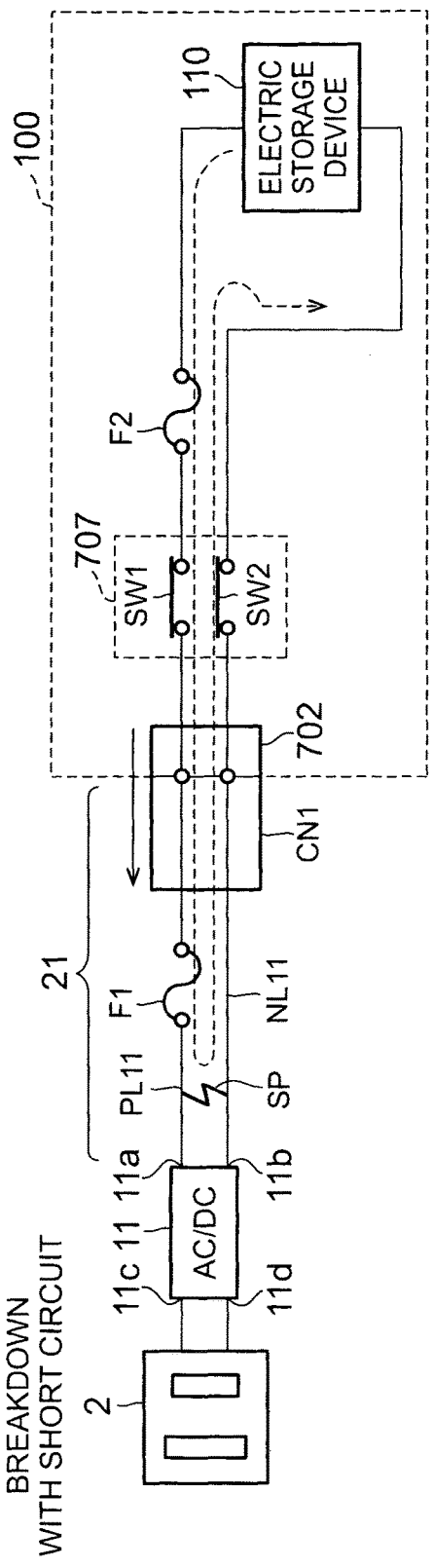

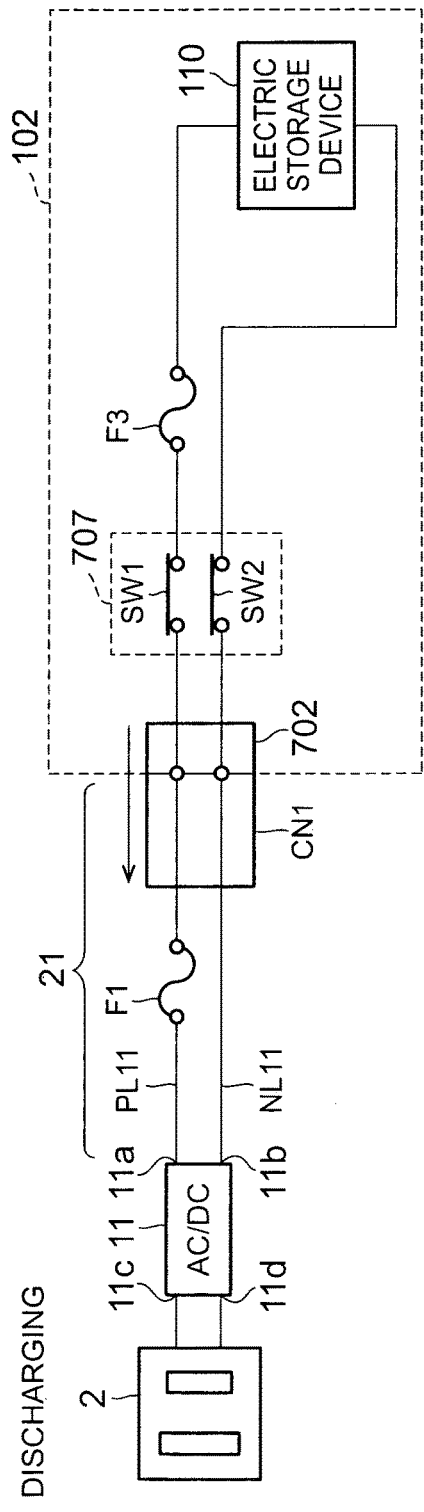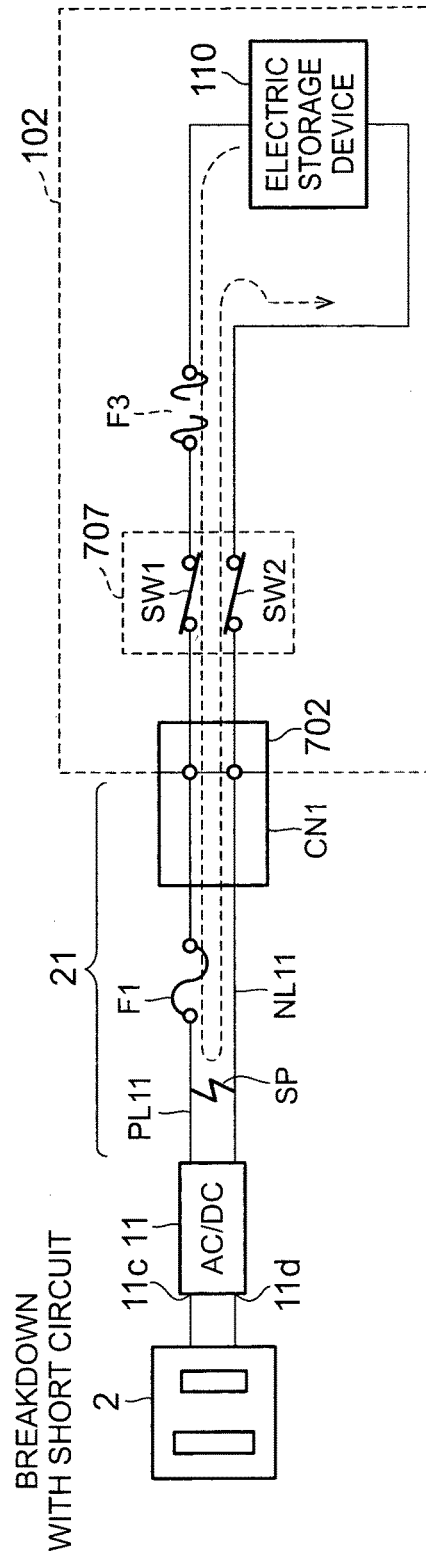

CHARGING AND DISCHARGING SYSTEM FOR A VEHICLE INCLUDING A FIRST FUSE IN THE VEHICLE AND A SECOND FUSE IN A CABLE CONNECTED TO THE VEHICLE

BACKGROUND OF THE INVENTION

1. Field of the Invention

The present invention relates to a charging and discharging system, and more particularly, to a charging and discharging system including a vehicle having an electric storage device mounted thereon and a charging and discharging device charging and discharging the electric storage device and a vehicle used in the charging and discharging system.

2. Description of Related Art

In recent years, a charging device has been developed which converts commercial AC power into DC power and which supplies the DC power to an electric storage device of a vehicle such as an electric vehicle. Japanese Patent Application Publication No. 2012-70577 (JP 2012-70577 A) discloses a discharging device that converts DC power of an electric storage device of a vehicle into AC power and that supplies the AC power to a load.

However, when the charging device and the discharging device are individually provided, efficiency is poor and thus there is demand for development of a charging and discharging device capable of performing both charging and discharging of an electric storage device of a vehicle. When such a charging and discharging device is used, it is assumed that the same cable as in the related art is used. This cable includes a connector connected to an inlet of a vehicle, a fuse, and a power line. In the vehicle, a relay and a fuse are disposed between the inlet and the electric storage device (see FIG. 2A).

When the charging and discharging device and the inlet of the vehicle are connected to each other via the cable and the electric storage device is discharged, it is thought that a power line short-circuits and an overcurrent flows from the electric storage device into the short-circuited portion of the power line. When the fuse of the vehicle is not melted down but the relay is fixed to the ON state, and the fuse of the cable is melted down, a state may be maintained in which the voltage of the electric storage device is applied to the inlet of the vehicle (see FIG. 2B).

SUMMARY OF THE INVENTION

Therefore, the invention provides a charging and discharging system capable of preventing the voltage of an electric storage device from being exposed at the time of breakdown and a vehicle used in the charging and discharging system.

A charging and discharging system according to the invention includes a vehicle, a cable, and a charging and discharging device. The vehicle includes an electric storage device, a first fuse, and an inlet. The electric storage device is configured to store DC power. The first fuse has one terminal and the other terminal. The one terminal of the first fuse is connected to the electric storage device. The inlet is connected to the other terminal of the first fuse. The cable includes a connector, a second fuse, and a power line. The connector is connected to the inlet. The second fuse has one terminal and the other terminal. The one terminal of the second fuse is connected to the connector. The charging and discharging device is configured to convert AC power supplied from a commercial AC power source into DC power and to supply the DC power to the electric storage device via the cable in a charging mode. The charging and discharging device is configured to convert DC power supplied from the electric storage device via the cable into AC power and to supply the AC power to a load in a discharging mode. The power line is connected between the other terminal of the second fuse and the charging and discharging device. The first fuse is configured to be melted and cut earlier than the second fuse when the power line causes a short circuit in the discharging mode.

Therefore, according to the invention, when the power line short-circuits during discharging of the electric storage device and an overcurrent flows from the electric storage device to the short-circuited portion of the power line, the first fuse is melted and cut earlier than the second fuse and thus the inlet and the electric storage device of the vehicle are electrically disconnected from each other. Accordingly, it is possible to prevent the voltage of the electric storage device from being exposed at the time of breakdown.

The rated current of the first fuse may be smaller than the rated current of the second fuse. In this case, the first fuse is melted and cut earlier than the second fuse.

The vehicle may further include a relay that is connected between the other terminal of the first fuse and the inlet and that is turned on in the charging mode and the discharging mode. In this case, since the relay is provided, it is possible to disconnect the inlet and the electric storage device from each other in a mode other than the charging mode and the discharging mode.

The vehicle may further include a controller configured to control the relay. The controller and the charging and discharging device are coupled to each other by a communication line. The charging and discharging device is configured to transmit the specification of the second fuse to the controller via the communication line before the discharging of the electric storage device is started. The controller is configured to determine whether the first fuse is melted and cut more easily than the second fuse on the basis of the specification of the first fuse stored in advance and the specification of the second fuse transmitted from the charging and discharging device. The controller is configured to turn on the relay when it is determined that the first fuse is melted and cut more easily than the second fuse and to turn off the relay when it is determined that the first fuse is not melted and cut more easily than the second fuse. In this case, when the first fuse is not melted and cut more easily than the second fuse, the relay is turned off and it is thus possible to prevent the voltage of the electric storage device from being exposed at the time of breakdown.

A vehicle according to the invention includes an electric storage device, a first fuse, a relay, an inlet, and a controller. The electric storage device is configured to store DC power. The first fuse has one terminal and the other terminal. The one terminal of the first fuse is connected to the electric storage device. The relay has one terminal and the other terminal. The one terminal of the relay is connected to the other terminal of the first fuse. The inlet is connected to the other terminal of the relay. The inlet is connected to a charging and discharging device via a cable in a charging mode and a discharging mode. The charging mode is a mode in which the electric storage device is charged. The discharging mode is a mode in which the electric storage device is discharged. The controller is configured to control the relay. The controller is configured to determine whether the first fuse is melted and cut more easily than the second fuse on the basis of specification of the first fuse stored in advance and specification of a second fuse. The second fuse is included in the cable. The specification of the second fuse is transmitted from the charging and discharging device before the discharging of the electric storage device is started in the discharging mode. The controller is configured to turn on the relay and to transmit a signal for permitting the discharging of the electric storage device to the charging and discharging device when the first fuse is determined to be melted and cut more easily than the second fuse. The controller is configured to turn off the relay and to transmit a signal for inhibiting the discharging of the electric storage device to the charging and discharging device when the first fuse is determined to be not melted and cut more easily than the second fuse. In this case, when the first fuse is not melted and cut more easily than the second fuse, the relay is turned off and it is thus possible to prevent the voltage of the electric storage device from being exposed at the time of breakdown.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 2A is a circuit block diagram illustrating principal parts of a charging and discharging system using the charging system illustrated in FIGS. 1A and 1B;

FIG. 2B is a circuit block diagram illustrating principal parts of a charging and discharging system using the charging system illustrated in FIGS. 1A and 1B;

FIG. 3A is a circuit block diagram illustrating principal parts of a charging and discharging system according to Embodiment 1 of the invention;

FIG. 3B is a circuit block diagram illustrating principal parts of the charging and discharging system according to Embodiment 1 of the invention;

DETAILED DESCRIPTION OF EMBODIMENTS

Figure 1A:
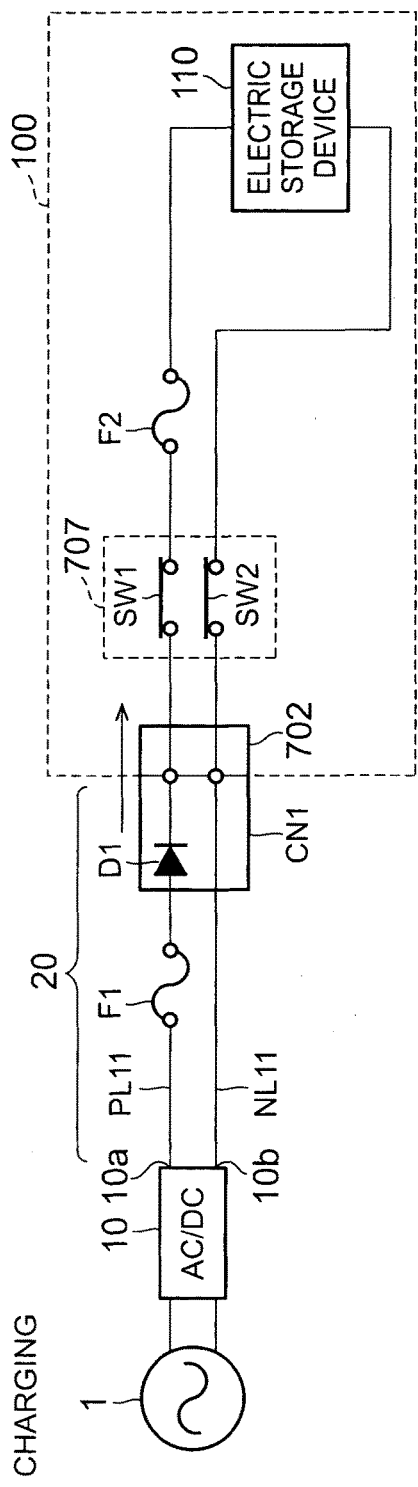
FIG. 1A is a circuit block diagram illustrating principal parts of a charging system serving as a basis of the invention.

FIG. 1A is a circuit block diagram illustrating principal parts of a charging system serving as the basis of the invention. In FIG. 1A, the charging system includes a charging device 10, a cable 20, and a vehicle 100. The cable 20 includes a positive power line PL11, a negative power line NL11, a fuse F1, a diode D1, and a connector CN1.

One end of the positive power line PL11 is connected to a positive voltage terminal 10a of the charging device 10. One terminal of the fuse F1 is connected to the other end of the positive power line PL11. The fuse F1 is melted down to protect the cable 20 or the like when a current larger than a predetermined rated current flows. The diode D1 is received in the connector CN1, the anode thereof is connected to the other terminal of the fuse F1, and the cathode thereof is connected to a positive voltage terminal of the connector CN1. The diode D1 prevents a DC current from flowing backward from the vehicle 100 to the charging device 10. The negative power line NL11 is connected between a negative voltage terminal 10b of the charging device 10 and a negative voltage terminal of the connector CN1.

The vehicle 100 includes a DC inlet 702, a DC relay 707, a fuse F3, and an electric storage device 110. The DC relay 707 includes switches SW1, SW2. The switches SW1, SW2 are switched to a connected state in a charging mode in which the electric storage device 110 is charged. A positive voltage terminal of the DC inlet 702 is connected to a positive electrode of the electric storage device 110 via the switch SW1 and the fuse F3. The fuse F3 is melted down to protect the electric storage device 110 or the like when a current larger than a predetermined rated current flows. The rated current of the fuse F3 is equal to the rated current of the fuse F1. A negative voltage terminal of the DC inlet 702 is connected to a negative electrode of the electric storage device 110 via the switch. SW2.

When the connector CN1 is inserted into the DC inlet 702, the positive voltage terminal and the negative voltage terminal of the connector CN1 and the positive voltage terminal and the negative voltage terminal of the DC inlet 702 are connected to each other, respectively. When an instruction to start charging is given, the switches SW1, SW2 of the DC relay 707 are switched to the connected state. The charging device 10 includes an AC/DC converter, converts AC power from a commercial AC power source 1 into DC power, and supplies the DC power to the electric storage device 110 of the vehicle 100 via the cable 20. Accordingly, the DC power is stored in the electric storage device 110.

When charging of the electric storage device 110 ends, the switches SW1, SW2 of the DC relay 707 are switched to a disconnected state. The connector CN1 is pulled out of the DC inlet 702 by a user. The vehicle 100 is driven with the DC power of the electric storage device 110 or the like.

Figure 1B:
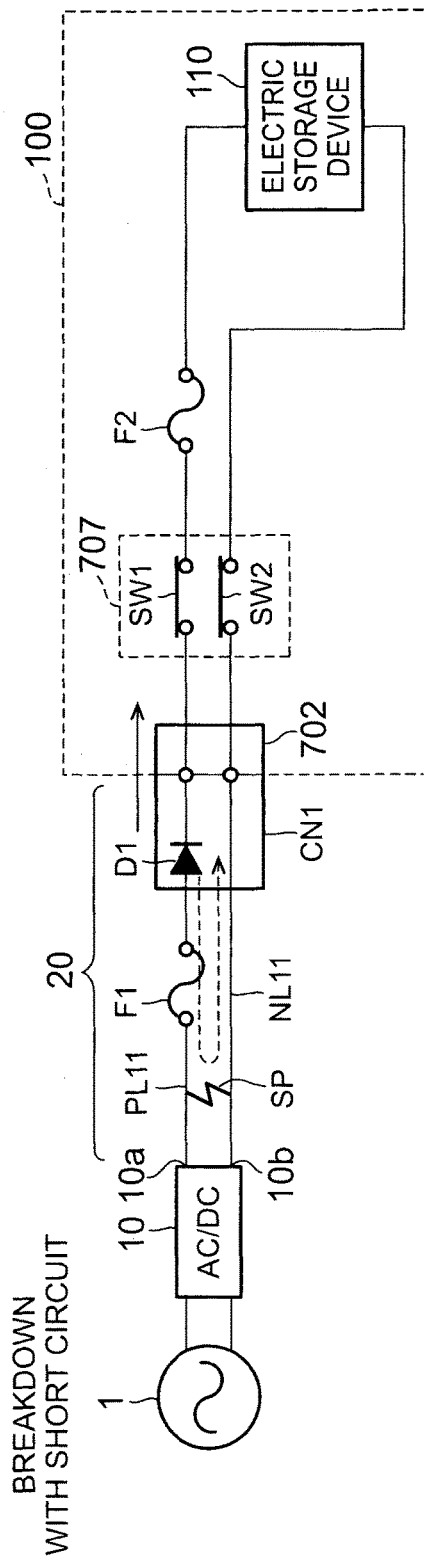
FIG. 1B is a circuit block diagram illustrating principal parts of a charging system serving as a basis of the invention.

As illustrated in FIG. 1B, when the cable 20 is destroyed or cut during charging and the power lines PL11, NL11 short-circuit, output terminals 10a, 10b of the charging device 10 are in a floating state by a protection circuit of the charging device 10. Since the diode D1 becomes a reverse bias and is in a disconnected state, a current does not flow backward from the electric storage device 110 to the short-circuited portion SP. When the DC relay 707 is switched to the disconnected state by the user, the DC inlet 702 and the electric storage device 110 are electrically disconnected from each other and the connector CN1 can be safely detached.

JP 2012-70577 A discloses the discharging device that converts DC power of the electric storage device of the vehicle into AC power and that supplies the AC power to a load. When the charging device and the discharging device are individually provided, the efficiency is poor and thus there is demand for development of a charging and discharging device capable of performing both charging and discharging of the electric storage device 110 of the vehicle 100.

FIG. 2A is a circuit block diagram illustrating principal parts of a charging and discharging system using the charging system illustrated in FIG. 1A and is a diagram which is contrasted with FIG. 1A. Referring to FIG. 2A, the charging and discharging system is different from the charging system illustrated in FIG. 1A, in that the charging device 10 is replaced with a charging and discharging device 11 and the cable 20 is replaced with a cable 21. The cable 21 is obtained by removing the backflow-preventing diode D1 from the cable 20. The ends on one side of the power lines PL11, NL11 are connected to a positive voltage terminal 11a and a negative voltage terminal 11b of the charging and discharging device 11, respectively.

The charging and discharging device 11 includes a bidirectional AC/DC converter, and AC terminals 11c, 11d are connected to a household plug socket 2. The plug socket 2 is supplied with AC power from the commercial AC power source 1 and is connected to a household electrical device (load) via a plug (not illustrated). When an instruction to start charging or discharging is given, the switches SW1, SW2 of the DC relay 707 in the vehicle 100 are turned on.

In the charging mode, similarly to the charging device 10, the charging and discharging device 11 converts AC power supplied from the commercial AC power source 1 connected to the plug socket 2 into DC power and supplies the DC power to the electric storage device 110 of the vehicle 100 via the cable 21. In the discharging mode, the charging and discharging device 11 converts DC power supplied from the electric storage device 110 via the cable 21 into AC power and supplies the AC power to the commercial AC power source 1 and the household electrical device (load) connected to the plug socket 2. The AC power supplied to the commercial AC power source 1 is used, for example, by another household electrical device (load).

According to this charging and discharging system, it is possible to reduce peaks in power consumption by charging the electric storage device 110 in a time zone in which the power consumption is small and discharging the electric storage device 110 in a time zone in which the power consumption is great. In the time zone in which the power consumption is small, power rates are low and thus the power rates of home can be saved. The household electrical device can be utilized even in emergency such as power failure.

However, as illustrated in FIG. 2B, when the cable 21 is destroyed or cut in the discharging mode and the power lines PL11, NL11 short-circuit, a large current flows from the positive electrode of the electric storage device 110 into the negative electrode of the electric storage device 110 via the fuse F3, the switch SW1, the fuse F1, the short-circuited portion SP, and the switch SW2.

When a large current flows into the DC relay 707, electrical repulsion (electromagnetic repulsion) occurs and the switches SW1, SW2 are about to be turned off. Since arc discharge occurs at this time, the switches SW1, SW2 are melted and secured and are fixed to the connected state. That is, the DC relay 707 is secured to the ON state and is fixed to the connected state. When the fuse F1 is melted down earlier than the fuse F3, the short-circuit current is intercepted, but the inter-terminal voltage of the electric storage device 110 is applied across the terminals of the DC inlet 702.

When the user pulls out the connector CN1 from the DC inlet 702 in this state, the terminal of the DC inlet 702 to which the voltage of the electric storage device 110 is applied is exposed. The invention is made to avoid such a case.

FIG. 3A is a circuit block diagram illustrating principal parts of a charging and discharging system according to Embodiment 1 of the invention and is a diagram which is contrasted with FIG. 2A. Referring to FIG. 3A, the charging and discharging system is different from the charging and discharging system illustrated in FIG. 2A, in that the vehicle 100 is replaced with a vehicle 102. In the vehicle 102, the fuse F3 of the vehicle 100 is replaced with a fuse F3. The rated current of the fuse F3 is smaller than the rated current of the fuse F1. Accordingly, the fuse F3 is melted and cut more easily than the fuse F1.

When the cable 21 is destroyed or cut off in the discharging mode and the power lines PL11, NL11 short-circuit, as illustrated in FIG. 3B, a large current flows from the positive electrode of the electric storage device 110 to the negative electrode of the electric storage device 110 via the fuse F3, the switch SW1, the fuse F1, the short-circuited portion SP, and the switch SW2.

At this time, the fuse F3 is melted and cut earlier than the fuse F1 and a path through which a short-circuit current flows is intercepted. Accordingly, even when the DC relay 707 is secured in the ON state, the positive terminal of the DC inlet 702 and the positive voltage terminal of the electric storage device 110 are electrically disconnected from each other and the terminal of the DC inlet 702 to which the voltage of the electric storage device 110 is applied is not exposed. Accordingly, a user can safely pull out the connector CN1 from the DC inlet 702. The other configurations and operations are the same as in the charging and discharging system illustrated in FIGS. 2A, 2B and description thereof will not be repeated.

Figure 4:
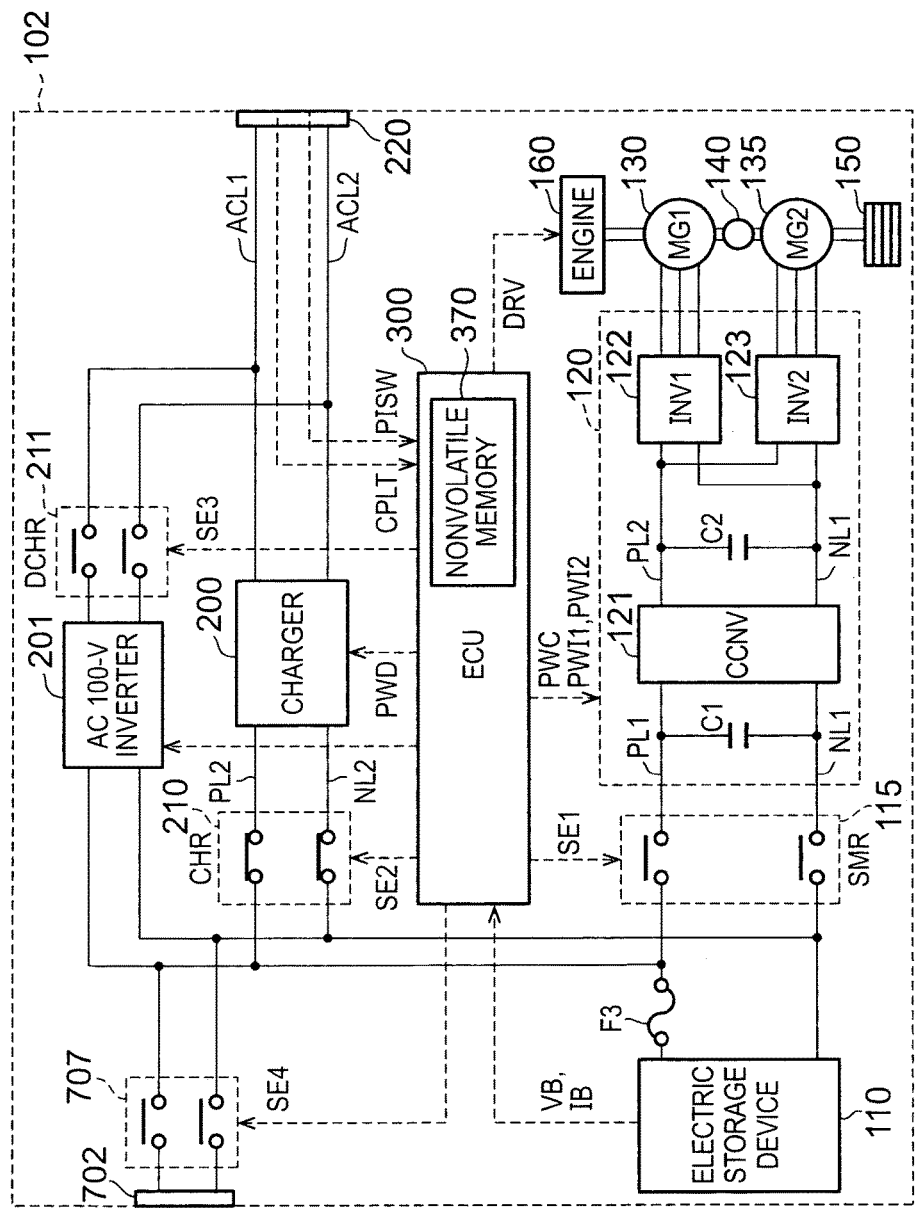
FIG. 4 is a circuit block diagram illustrating a configuration of a vehicle illustrated in FIGS. 3A and 3B.

FIG. 4 is a circuit block diagram illustrating the configuration of the vehicle 102 illustrated in FIG. 3A and FIG. 3B in detail. In FIG. 4, the vehicle 102 is a hybrid vehicle and includes an electric storage device 110, a fuse F3, a system main relay (SMR) 115, a power control unit (PCU) 120, motor-generator sets 130, 135, a power transmission gear 140, driving wheels 150, an engine 160, and an ECU 300 as a controller. The PCU 120 includes a converter 121, inverters 122, 123, and capacitors C1, C2.

The electric storage device 110 is a power storage element configured to be chargeable and dischargeable. The electric storage device 110 includes a secondary battery such as a lithium-ion battery, a nickel-hydrogen battery, and a lead storage battery or an electric storage element such as an electrical double-layer capacitor.

The electric storage device 110 is connected to the PCU 120 via the fuse F3, the SMR 115, the positive power line PL1, and the negative power line NL1. The electric storage device 110 supplies the PCU 120 with power for generating a drive force of the vehicle 102. The electric storage device 110 stores power generated by the motor-generator sets 130, 135. The output of the electric storage device 110 is, for example, about 200 V.

The electric storage device 110 includes a voltage sensor and a current sensor which are not illustrated and outputs the voltage VB and the current IB of the electric storage device 110 detected by the sensors to the ECU 300.

One terminal of the switch on the positive voltage side out of two switches of the SMR 115 is connected to the positive electrode of the electric storage device 110 via the fuse F3, and the other terminal thereof is connected to the converter 121 via the positive power line PL1. One terminal of the switch on the negative voltage side out of two switches of the SMR 115 is connected to the negative electrode of the electric storage device 110, and the other terminal thereof is connected to the converter 121 via the negative power line NL1.

The SMR 115 switches the supply of power and the stop of power supply between the electric storage device 110 and the PCU 120 on the basis of a control signal SE1 from the ECU 300. The fuse F3 is melted down to protect the electric storage device 110 from an overcurrent when the overcurrent flows.

The converter 121 performs voltage conversion between the positive power line PL1 and the negative power line NL1 and between the positive power line PL2 and the negative power line NL1 on the basis of a control signal PWC from the ECU 300.

The inverters 122, 123 are connected in parallel to the positive power line PL2 and the negative power line NL1. The inverters 122, 123 convert DC power supplied from the converter 121 into AC power and drive the motor-generator sets 130, 135, respectively, on the basis of control signals PWI1, PWI2 from the ECU 300.

The capacitor C1 is disposed between the positive power line PL1 and the negative power line NL1 and reduces voltage fluctuation between the positive power line PL1 and the negative power line NL1. The capacitor C2 is disposed between the positive power line PL2 and the negative power line NL1 and reduces voltage fluctuation between the positive power line PL2 and the negative power line NL1.

The motor-generator sets 130, 135 are AC rotary motors, for example, permanent magnet-type synchronous motors including a rotor having a permanent magnet buried therein.

The output torques of the motor-generator sets 130, 135 are transmitted to the driving wheels 150 via the power transmission gear 140 including a reduction gear or a power distribution mechanism so as to cause the vehicle 102 to run. The motor-generator sets 130, 135 can generate electric power by the rotation force of the driving wheels 150 at the time of a generative braking operation of the vehicle 102. The generated electric power is converted into charging power of the electric storage device 110 by the PCU 120.

The motor-generator sets 130, 135 are coupled to the engine 160 via the power transmission gear 140. The motor-generator sets 130, 135 and the engine 160 are operated in cooperation to generate a necessary vehicle driving force by the ECU 300. The motor-generator sets 130, 135 can generate electric power by the rotation of the engine 160 and can charge the electric storage device 110 with the generated electric power. In Embodiment 1, the motor-generator set 135 is used as only an electric motor for driving the driving wheels 150, and the motor-generator set 130 is used as only a power generator driven by the engine 160.

FIG. 4 illustrates the configuration in which two motor-generator sets are provided, but the number of motor-generator sets is not limited to this configuration. A configuration in which the number of motor-generator sets is one or a configuration in which the number of motor-generator sets is two or greater may be employed. The vehicle 102 may be an electric automobile not equipped with an engine or a fuel-cell vehicle.

The vehicle 102 includes a DC inlet 702, a DC relay 707, and a fuse F3, as a configuration for charging and discharging the electric storage device 110 with the charging and discharging device 11. These configurations and operations have been described above with reference to FIGS. 1A to 3B and thus description thereof will not be repeated.

The vehicle 102 includes a charger 200, a charging relay CHR 210, and an AC inlet 220 as an AC connection unit, as a configuration for charging the electric storage device 110 with power from an external AC power source 500.

Figure 5:
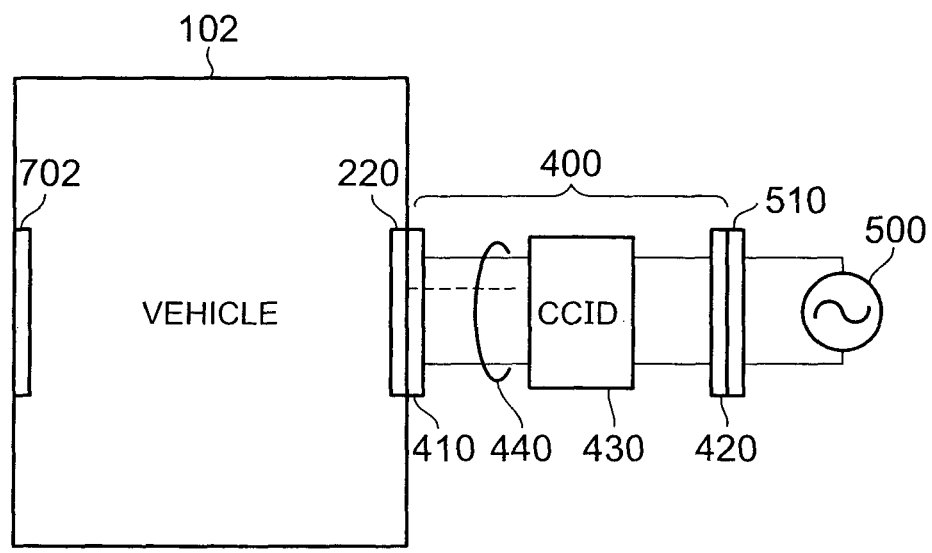
FIG. 5 is a circuit block diagram illustrating a configuration of an AC charging cable connected to the vehicle illustrated in FIG. 4.

At the time of AC charging and discharging, a charging connector 410 of a charging cable 400 is connected to the AC inlet 220 as illustrated in FIG. 5. Power from the external AC power source 500 is supplied to the vehicle 102 via the charging cable 400.

The charging cable 400 includes a plug 420 for connection to a socket 510 of the external AC power source 500 and a power line 440 for connecting the charging connector 410 and the plug 420 to each other, in addition to the charging connector 410. A charging circuit interrupt device (hereinafter, also referred to as CCID) 430 for switching the supply of power and the stop of power supply from the external AC power source 500 is inserted into the power line 440.

The charger 200 is connected to the AC inlet 220 via power lines ACL1, ACL2. The charger 200 is connected to the electric storage device 110 via the CHR 210 and the fuse F3.

The charger 200 is controlled by a control signal PWD from the ECU 300 and converts AC power supplied from the AC inlet 220 into charging power of the electric storage device 110.

The vehicle 102 further includes an AC 100-V inverter 201 and a discharging relay DCHR 211 as a configuration for supplying electric power to the outside. The AC inlet 220 is also used as a connection portion for outputting AC power.

The AC 100-V inverter 201 is connected to the electric storage device 110 via the fuse F3 and is connected to the PCU 120 via the SMR 115. The AC 100-V inverter 201 can convert DC power from the electric storage device 110 or DC power generated by the motor-generator sets 130, 135 and converted by the PCU 120 into AC power and can supply the AC power to the outside of the vehicle. Another device for outputting AC voltage or DC voltage may be provided instead of the AC 100-V inverter 201. The charger 200 and the AC 100-V inverter 201 may be a single device capable of converting power in both charging and discharging.

The CHR 210 is connected to the electric storage device 110 via the fuse F3 and is connected to the charger 200. The CHR 210 is controlled by a control signal SE2 from the ECU 300 and switches the supply of power and the stop of power supply between the charger 200 and the electric storage device 110. The DCHR 211 is controlled by a control signal SE3 from the ECU 300 and switches the setup and the interruption of a power path between the AC inlet 220 and the AC 100-V inverter 201. At the time of charging illustrated in FIG. 4, the CHR 210 is controlled to enter a connected state and the DCHR 211 is controlled to enter a disconnected state.

The ECU 300 includes a nonvolatile memory 370 for storing initial settings of an air-conditioner or the like. The ECU 300 further includes a central processing unit (CPU), a storage unit, and an input and output buffer which are not illustrated in FIG. 4, performs inputting of a signal from various sensors and the like or outputting of control signals to various units, and controls the electric storage device 110 and the units of the vehicle 102. These controls are not limited to processing by software, but may be processed by dedicated hardware (electronic circuit).

The ECU 300 computes the state of charge (SOC) of the electric storage device 110 on the basis of the detected values of the voltage VB and the current IB from the electric storage device 110.

The ECU 300 receives a proximity detection signal PISW (hereinafter, referred to as detection signal PISW) indicating the connection state of the charging cable 400 from the charging connector 410. The ECU 300 receives a control pilot signal CPLT (hereinafter, referred to as a pilot signal CPLT) from the CCID 430 of the charging cable 400. The ECU 300 performs the charging operation on the basis of the received signals.

FIG. 4 illustrates the configuration in which a single controller is disposed as the ECU 300, but a configuration in which an individual controller is provided for each function or for each control target device, such as a controller for the PCU 120 or a controller for the electric storage device 110, may be employed.

Charging and discharging with AC power will be described below. The configurations of the pilot signal CPLT and the detection signal PISW used for charging with AC power, the shapes of the AC inlet 220 and the charging connector 410, the terminal arrangement, and the like are standardized, for example, by the Society of Automotive Engineers (SAE), the International Electrotechnical Commission (IEC), or the like.

The CCID 430 includes a CPU, a storage unit, and an input and output buffer which are not illustrated, inputs and outputs sensor signals and control pilot signals, and controls the charging operation of the charging cable 400.

The potential of the pilot signal CPLT is adjusted by the ECU 300. The duty cycle thereof is set on the basis of the rated current which can be supplied from the external AC power source 500 to the vehicle 102 via the charging cable 400.

The pilot signal CPLT is oscillated in a prescribed period when the potential of the pilot signal CPLT is lowered from a prescribed potential. Here, the pulse width of the pilot signal CPLT is set on the basis of the rated current which can be supplied from the external AC power source 500 to the vehicle 102 via the charging cable 400. That is, the rated current is notified from a control pilot circuit of the CCID 430 to the ECU 300 of the vehicle 102 using the pilot signal CPLT by the duty which is expressed by a ratio of the pulse width to the oscillation period.

The rated current is determined for each charging cable, and the rated current varies depending on the type of the charging cable 400. Therefore, the duty of the pilot signal CPLT varies depending on the charging cable 400.

The ECU 300 can detect the rated current which can be supplied to the vehicle 102 via the charging cable 400 on the basis of the duty of the received pilot signal CPLT.

When a contact of a relay in the CCID 430 is closed, AC power from the external AC power source 500 is supplied to the charger 200 and the charging of the electric storage device 110 with the external AC power source 500 is ready. The ECU 300 converts the AC power from the external AC power source 500 into DC power with which the electric storage device 110 can be charged by outputting the control signal PWD to the charger 200. The ECU 300 performs charging of the electric storage device 110 by outputting the control signal SE2 to close the contact of the CHR 210.

Like a so-called smart grid, it is reviewed that a vehicle is considered as a power source and electric power stored in the vehicle is supplied to an electrical device outside the vehicle. A vehicle may be used as a power source for use of electrical devices in a camp or outdoor work.

In this case, when electric power can be supplied from the vehicle via the AC inlet 220 connected to the charging cable 400 at the time of external charging, it is not necessary to individually provide an outlet for connection to an electrical device and thus there is no necessity for remodeling a vehicle or it is possible to reduce the necessity for remodeling a vehicle, which is suitable.

Accordingly, in Embodiment 1, AC power can be supplied to an electrical device outside of the vehicle via the AC inlet 220. In this case, a power supply connector (not illustrated) for coupling the AC inlet 220 to a plug of an electrical device is inserted into the AC inlet 220. By insertion of the power supply connector, AC power generated by the AC 100-V inverter 201 can be supplied to a household electrical device.

Figure 6:
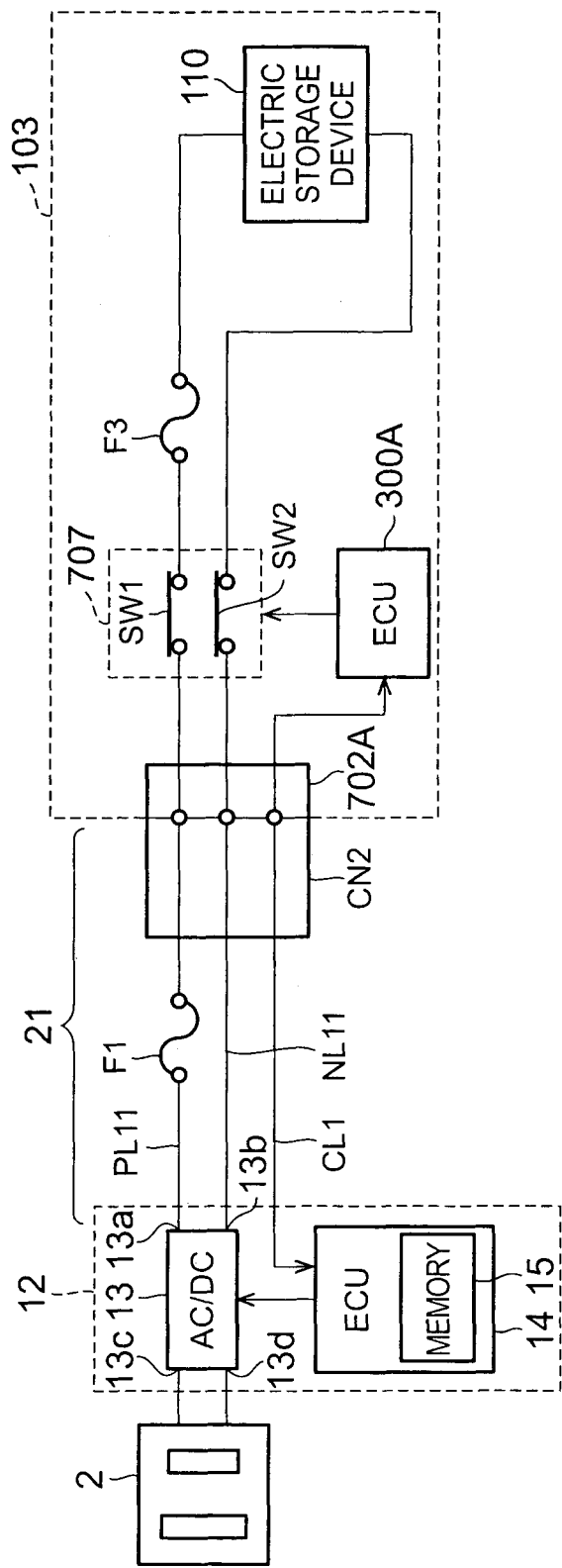
FIG. 6 is a circuit block diagram illustrating principal parts of a charging and discharging system according to Embodiment 2 of the invention.
Figure 7:
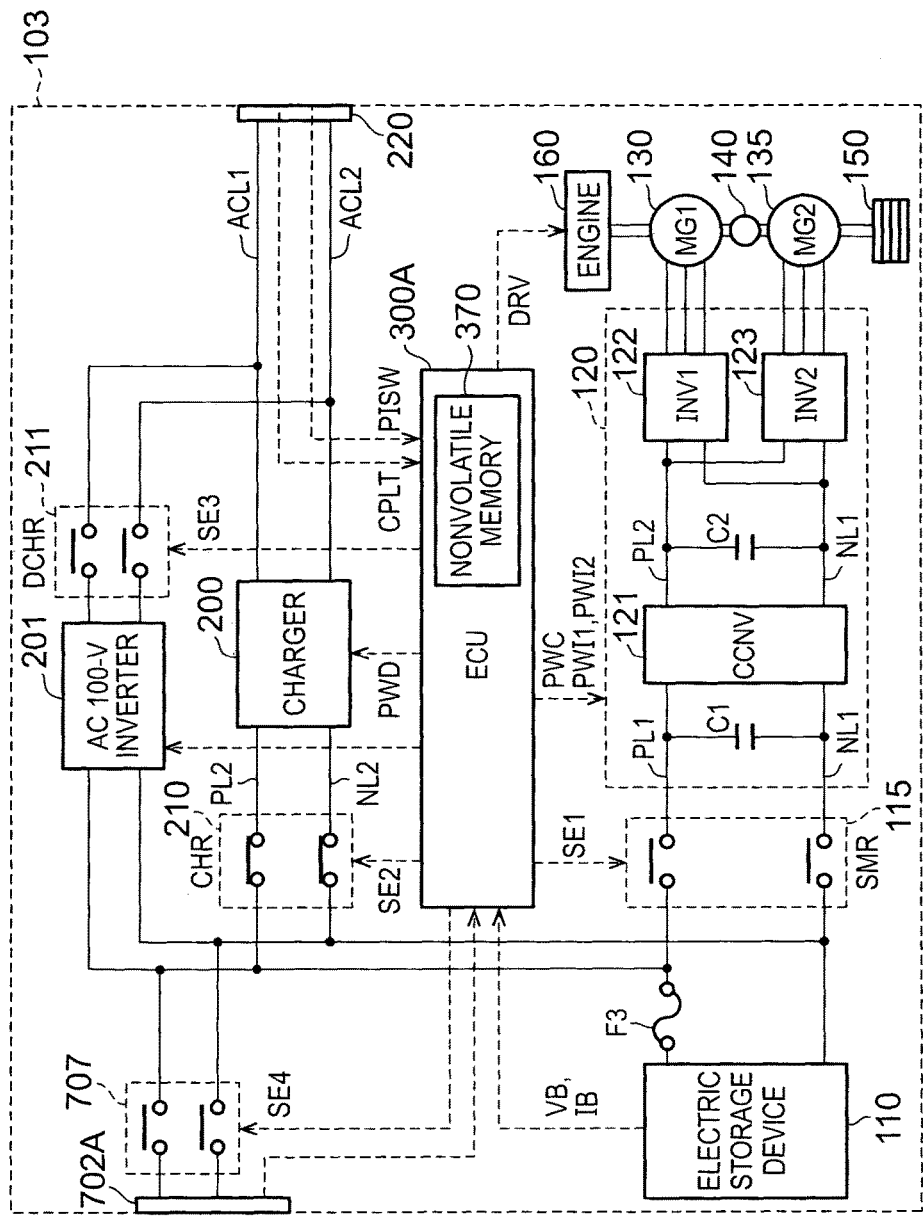
FIG. 7 is a circuit block diagram illustrating a configuration of a vehicle illustrated in FIG. 6.

FIG. 6 is a circuit block diagram illustrating principal parts of a charging and discharging system according to Embodiment 2 of the invention and is a diagram contrasted with FIG. 3A. FIG. 7 is a circuit block diagram illustrating a configuration of a vehicle 103 illustrated in FIG. 6 and is a diagram contrasted with FIG. 4. Referring to FIG. 6 and FIG. 7, the charging and discharging system includes a vehicle 103, a cable 22, and a charging and discharging device 12.

In the vehicle 103, the DC inlet 702 and the ECU 300 of the vehicle 102 are replaced with a DC inlet 702A and an ECU 300A, respectively. The DC inlet 702A includes a communication terminal in addition a positive voltage terminal and a negative voltage terminal. The communication terminal of the DC inlet 702A is connected to the ECU 300A. The ECU 300A will be described later.

In the cable 22, the connector CN1 of the cable 21 is replaced with a connector CN2 and a communication line CL1 is added thereto. The connector CN2 includes a communication terminal in addition a positive voltage terminal and a negative voltage terminal. One terminal of the communication line CL1 is connected to the charging and discharging device 12 and the other terminal thereof is connected to the communication terminal of the connector CN2.

The charging and discharging device 12 includes a bidirectional AC/DC converter 13 and an ECU 14. The positive voltage terminal 13a of the bidirectional AC/DC converter 13 is connected to the positive voltage terminal of the connector CN2 via the positive power line PL11 and the fuse F1. The negative voltage terminal 13b of the bidirectional AC/DC converter 13 is connected to the negative voltage terminal of the connector CN2 via the negative power line NL11. The AC terminals 13c, 13d of the bidirectional AC/DC converter 13 are connected to the plug socket 2 of home. The plug socket 2 is supplied with AC power from the commercial AC power source 1 and is connected to an electrical device of home via a plug.

The ECU 14 is connected to the communication terminal of the connector CN2 via the communication line CL1. When the connector CN2 is inserted into the DC inlet 702A, the positive voltage terminal, the negative voltage terminal, and the communication terminal of the connector CN2 are connected to the positive voltage terminal, the negative voltage terminal, and the communication terminal of the DC inlet 702A, respectively. Accordingly, the bidirectional AC/DC converter 13 is connected to the vehicle 103 via the cable 22 and the electric storage device 110 can be charged and discharged with the bidirectional AC/DC converter 13. The ECU 14 and the ECU 300A are connected to each other via the communication line CL1 and the ECU 14 and the ECU 300A can communicate with each other in two ways.

The ECU 14 includes a nonvolatile memory 15. The specification (the rated current or the like) of the fuse F1 set in the cable 22 is stored in the nonvolatile memory 15. The ECU 14 transmits the specification of the fuse F1 read from the nonvolatile memory, 15 to the ECU 300A of the vehicle 103 via the communication line CL1, before starting the discharging of the electric storage device 110.

The ECU 300A stores the specification (the rated current or the like) of the fuse F3 set in the vehicle 103 in the nonvolatile memory 370. The ECU 300A determines whether the fuse F3 is melted and cut more easily than the fuse F1 on the basis of the stored specification of the fuse F3 and the specification of the fuse F1 transmitted from the ECU 14. For example, when a fuse having a rated current smaller than the rated current of the fuse F1 is routinely set as the fuse F3, it is determined that the fuse F3 is melted and cut more easily than the fuse F1. When a fuse having a rated current equal to or larger than the rated current of the fuse F1 is erroneously set as the fuse F3, it is determined that the fuse F3 is not melted and cut more easily than the fuse F1.

When it is determined that the fuse F3 is melted and cut more easily than the fuse F1, the ECU 300A transmits a discharge-permitting signal for permitting the discharging of the electric storage device 110 to the ECU 14 via the communication line CL1 and turns on the switches SW1, SW2 of the DC relay 707. The ECU 14 causes the bidirectional AC/DC converter 13 to perform a discharging operation in response to the discharge-permitting signal transmitted from the ECU 300A. The bidirectional AC/DC converter 13 converts DC power supplied from the electric storage device 110 via the cable 22 into AC power and supplies the AC power to the commercial AC power source 1 and an electric device (load) of home connected to the plug socket 2, under the control of the ECU 14. The AC power supplied to the commercial AC power source 1 is used, for example, for other electric devices (loads) of home.

When it is determined that the fuse F3 is not melted and cut more easily than the fuse F1, the ECU 300A transmits a discharge-inhibiting signal for inhibiting the discharging of the electric storage device 110 to the ECU 14 via the communication line CL1 and maintains the switches SW1, SW2 of the DC relay 707 in the OFF state. The ECU 14 does not cause the bidirectional AC/DC converter 13 to perform a discharging operation in response to the discharge-inhibiting signal transmitted from the ECU 300A but notifies a user that the discharging operation cannot be performed, using sound, light, images, and the like.

Before starting the charging operation, the ECU 14 inquires of the ECU 300A of the vehicle 103 whether the charging operation can be performed via the communication line CL1. The ECU 300A determines whether the charging operation can be performed on the basis of signals from various sensors (not illustrated) or the like. When it is determined that the charging operation can be performed, the ECU 300A turns on the switches SW1, SW2 of the DC relay 707 and transmits a charge-permitting signal for permitting the charging operation to the ECU 14 via the communication line CL1.

The ECU 14 cause the bidirectional AC/DC converter 13 to perform the charging operation in response to the charge-permitting signal transmitted from the ECU 300A. Under the control of the ECU 14, similarly to the charging device 10, the bidirectional AC/DC converter 13 converts AC power supplied from the commercial AC power source 1 connected to the plug socket 2 into DC power and supplies the DC power to the electric storage device 110 of the vehicle 103 via the cable 22.

When it is determined that the charging operation cannot be performed, the ECU 300A transmits a charge-inhibiting signal for inhibiting the charging operation to the ECU 14 via the communication line CL1 and maintains the switches SW1, SW2 of the DC relay 707 in the OFF state. The ECU 14 does not cause the bidirectional AC/DC converter 13 to perform the charging operation in response to the charge-inhibiting signal transmitted from the ECU 300A but notifies a user that the charging operation cannot be performed, using sound, light, images, and the like.

In Embodiment 2, the charging and discharging operations of the electric storage device 110 are permitted only when the fuse F3 is melted and cut more easily than the fuse F1. Accordingly, it is possible to satisfactorily prevent the terminal of the DC inlet 702 to which the voltage of the electric storage device 110 is applied from being exposed at the time of breakdown.

It should be understood that the above-mentioned embodiments are only examples but not restrictive. The scope of the invention is defined by the appended claims, not by the above-mentioned description, and includes all modifications within the meaning and scope equivalent to the claims.

What is claimed is:
1. A charging and discharging system comprising:
   a vehicle including:
      an electric storage device configured to store DC power;
      a first fuse having one terminal and the other terminal, the one terminal of the first fuse being connected to the electric storage device; and
      an inlet connected to the other terminal of the first fuse;
   a cable including:
      a connector connected to the inlet;
      a second fuse having one terminal and the other terminal, the one terminal of the second fuse being connected to the connector; and
      a power line; and
   a charging and discharging device configured to convert AC power supplied from a commercial AC power source into DC power and to supply the DC power to the electric storage device via the cable in a charging mode, the charging and discharging device being configured to convert DC power supplied from the electric storage device via the cable into AC power and to supply the AC power to a load in a discharging mode,
   wherein the power line is connected between the other terminal of the second fuse and the charging and discharging device, and
   the first fuse is configured to be melted and cut earlier than the second fuse when the power line causes a short circuit in the discharging mode.

2. The charging and discharging system according to claim 1, wherein a rated current of the first fuse is smaller than a rated current of the second fuse.

3. The charging and discharging system according to claim 1, wherein the vehicle further includes a relay connected between the other terminal of the first fuse and the inlet, and
   wherein the relay is turned on in the charging mode and the discharging mode.

4. The charging and discharging system according to claim 3, wherein the vehicle further includes a controller configured to control the relay,
   the controller and the charging and discharging device are coupled to each other by a communication line,
   the charging and discharging device is configured to transmit specification of the second fuse to the controller via the communication line before the discharging of the electric storage device is started,
   the controller is configured to determine whether the first fuse is melted and cut more easily than the second fuse on the basis of specification of the first fuse stored in advance and the specification of the second fuse transmitted from the charging and discharging device, and
   the controller is configured to turn on the relay when the first fuse is determined to be melted and cut more easily than the second fuse and to turn off the relay when the first fuse is determined to be not melted and cut more easily than the second fuse.

5. A vehicle comprising:

an electric storage device configured to store DC power;

a first fuse having one terminal and the other terminal, the one terminal of the first fuse being connected to the electric storage device;

a relay having one terminal and the other terminal, the one terminal of the relay being connected to the other terminal of the first fuse;

an inlet connected to the other terminal of the relay, the inlet being connected to a charging and discharging device via a cable in a charging mode and a discharging mode, the charging mode being a mode in which the electric storage device is charged, the discharging mode being a mode in which the electric storage device is discharged; and an controller configured to control the relay, wherein the controller is configured to determine whether the first fuse is melted and cut more easily than a second fuse on the basis of specification of the first fuse stored in advance and specification of the second fuse, the second fuse is included in the cable, and the specification of the second fuse is transmitted from the charging and discharging device before the discharging of the electric storage device is started in the discharging mode, and the controller is configured to turn on the relay and to transmit a signal for permitting the discharging of the electric storage device to the charging and discharging device when the first fuse is determined to be melted and cut more easily than the second fuse, and the controller is configured to turn off the relay and to transmit a signal for inhibiting the discharging of the electric storage device to the charging and discharging device when the first fuse is determined to be not melted and cut more easily than the second fuse.

* * * * *